Feb. 21, 1956    L. K. DIGET ET AL    2,735,473
HOSE COUPLING MOUNTING MACHINE
Filed Feb. 27, 1950    2 Sheets-Sheet 1
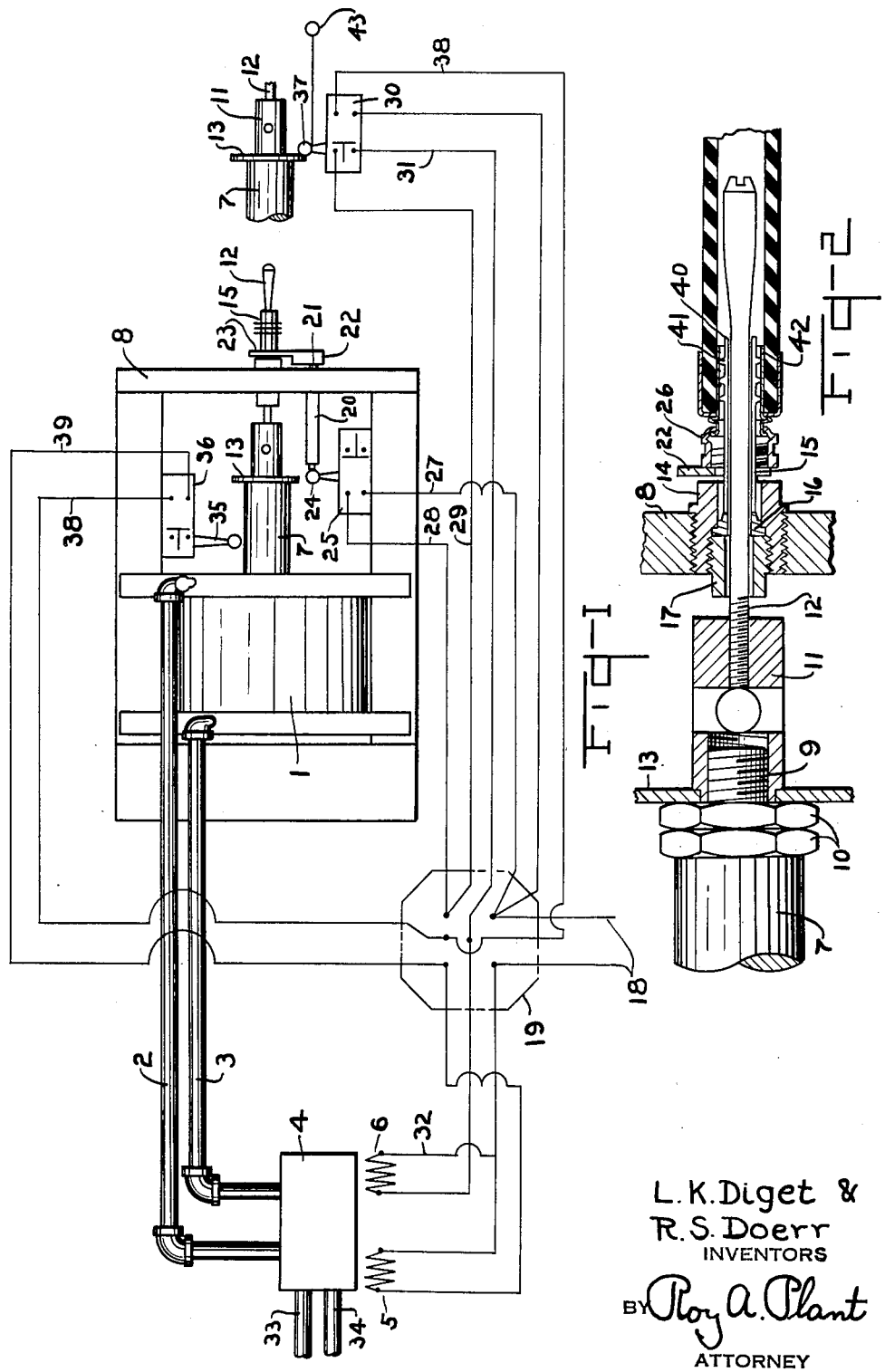
L.K. Diget &
R.S. Doerr
INVENTORS
BY Roy A. Plant
ATTORNEY

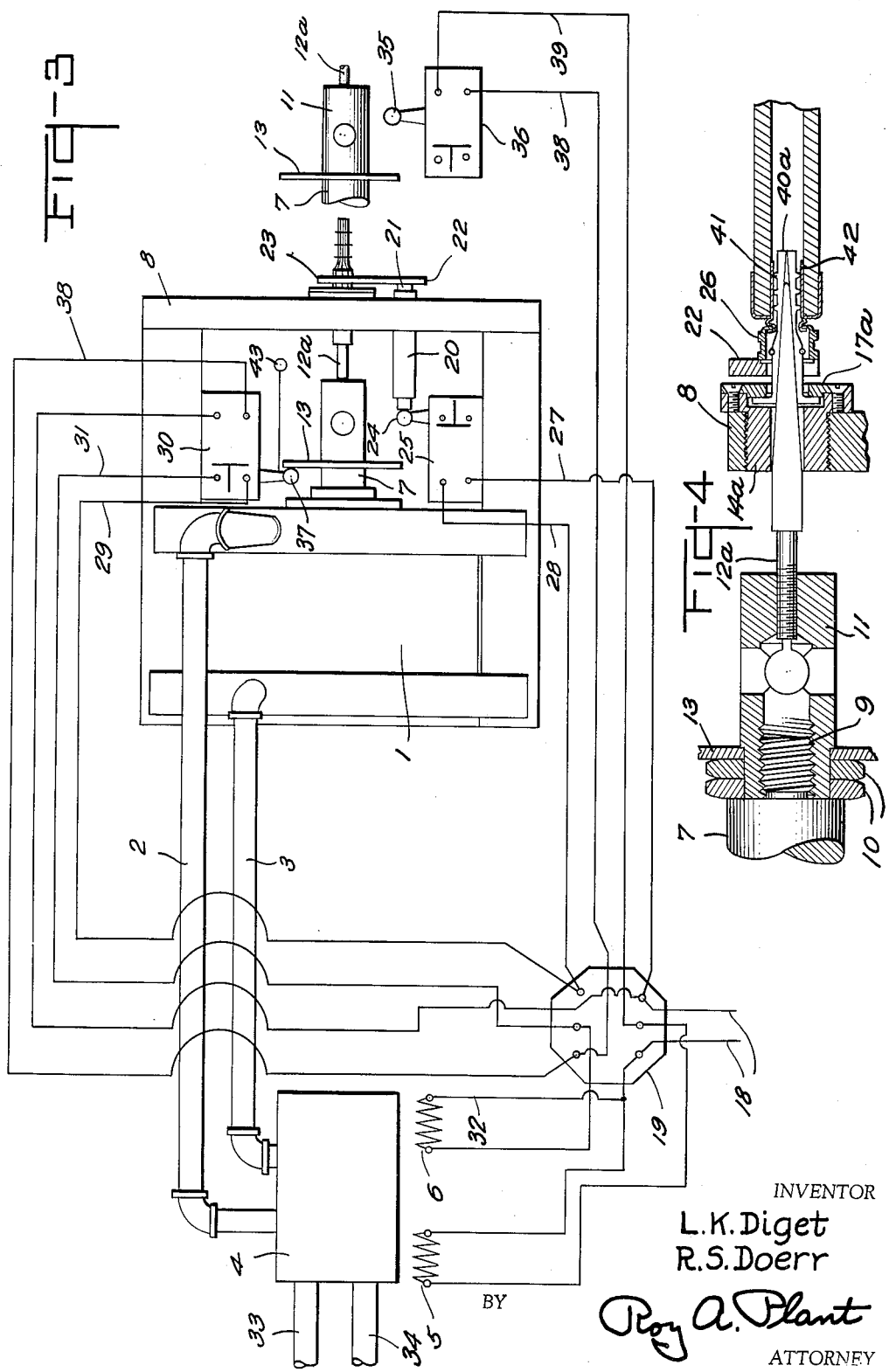

United States Patent Office 2,735,473
Patented Feb. 21, 1956

2,735,473
HOSE COUPLING MOUNTING MACHINE

Lewis Kenneth Diget and Raymond S. Doerr, Battle Creek, Mich., assignors to H. B. Sherman Manufacturing Company, Battle Creek, Mich., a corporation of Michigan Application February 27, 1950, Serial No. 146,434

3 Claims. (Cl. 153—1)

The present invention relates broadly to fluid operated machines, and in its specific phases to an air operated machine for mounting hose couplings on hose.

The mounting of separable couplings on hose was originally accomplished by preribbing the coupling sleeve and gripping the hose to same with a hose clamp, and latter by means of ferrules in the place of hose clamps, wherein either ribs or cross corrugations were placed in the ferrules after mounting in order to clamp the assembly firmly in place. With the advent of thin metal hose couplings and the need of rapid mounting of couplings as a matter of cost saving, and further the advisability of using a larger inside diameter coupling to prevent fluid flow choking effect, it appeared desirable to work out a system of fastening thin metal hose couplings on hose by outwardly expanding the coupling nipple or sleeve when inserted in the end of the hose, or by expanding an internal ferrule where the coupling sleeve was made to fit over the end of the hose on which the coupling is to be mounted. A machine capable of accomplishing that type of expansion is set forth in the co-pending patent application of Raymond S. Doerr, Ser. No. 30,377, filed June 1, 1948, and issued May 23, 1950, as Patent No. 2,508,377. That machine is of the foot operated type and led to the recognition that a faster operating machine should be developed. It was a recognition of the above situation which led to the conception and development of the present hose coupling mounting machine which is an improvement on the one above referred to.

Accordingly, among the objects of the present invention is the provision of an automatically operated, rapid acting, and highly efficient machine for use in mounting separable hose couplings on the ends of a section of hose.

Another object is to provide a hose coupling machine adapted to automatically place circumferential ribs in the interior nipple or sleeve portion of the hose coupling, preferably within the length of a ferrule mounted on the outer face of the end of the hose.

Another object is to provide an automatically operated machine for mounting separable hose couplings on the ends of a section of hose, wherein such machine utilizes an elongated expansion member having extending resilient multiple segments with circumferential ribs on the outer face of same in desired location for producing ribs in the coupling sleeve, preferably within the length of a ferrule mounted on the outer face of the end of a section of hose, this expansion member being fixedly held against endwise movement due to being rigidly anchored at one end.

Another object is to provide an automatically operated separable coupling mounting machine wherein the expansion member is actuated by means of an expansion mandrel which is movable in endwise direction by any suitable means.

A further object is to provide an automatically operated separable hose coupling mounting machine which permits the use of couplings having sleeves which are readily slid onto the end of the hose on which they are to be joined and wherein such coupling in the course of the operation of the machine has its sleeve expanded to provide substantially free fluid flow therethrough with all of the ribs expanded in the sleeve preferably being within the length of the ferrule on the outside of the end of the hose.

A further object is to provide an automatic hose coupling mounting machine which operates faster than a mechanically controlled machine.

A further object is to provide an automatically operated hose coupling machine which eliminates the human element of making sure that the coupling is in proper position on the expanding element before the machine is tripped to start the expansion cycle, such being accomplished by the use of a control which necessitates the coupling being properly located before the machine goes into operation.

A further object is to provide an automatically operated hose coupling mounting machine which is easy to manufacture, is long lived, and very easy to operate.

Still further objects and advantages of the present invention will appear as the description proceeds.

To the accomplishment of the foregoing and related ends the invention, then, consists of the means hereinafter fully described and particularly pointed out in the claims, the annexed drawing and the following description setting forth in detail certain means for carrying out the invention, such disclosed means illustrating however, but one of various ways in which the principle of the invention may be used.

In the annexed drawing:

Fig. 1 shows in diagrammatic manner one form of automatically operated apparatus for expansion fastening of a coupling half on the end of a section of hose, together with a schematic wiring diagram of the electric circuit involved.

Fig. 2 shows an enlarged center section view through the expansion member portion of Figure 1.

Figure 3 shows in diagrammatic manner another form of automatically operated apparatus for expansion fastening of a coupling half on the end of a section of hose, together with a schematic wiring diagram of the electric circuit involved.

Figure 4 shows an enlarged center section view through the expansion member portion of Figure 3.

Referring more particularly to Figure 1 of the drawing, it will be noted that the apparatus utilizes a fluid operated double acting cylinder 1 with fluid pipes 2 and 3 conventionally joined to the opposite ends of said cylinder. Those pipes in turn are connected to a conventional four-way valve 4 which is operated by means of solenoids 5 and 6.

Double acting cylinder 1 is conventionally provided with a piston (not shown) mounted on a piston rod 7 which passes through a conventional stuffing box (not shown) on the end of the cylinder 1, with the cylinder assembly mounted on a suitable frame 8.

Referring to Figure 2, it will be noted that piston rod 7 has an extending threaded end portion 9 on which is mounted a pair of lock nuts 10, and a mandrel connecting member 11. This member 11, has a mandrel 12 conventionally connected thereto, as by means of threads, with the axis of said mandrel being co-axial with said piston rod 7. This mandrel, as shown in Figure 2, extends through the hollow portion of expansion member 15, and has a substantially straight portion followed by a moderately outward tapering portion and a substantially straight portion of approximately the same size as the diameter of the largest portion of said taper. Also mounted on connecting member 11 is a radial disc member 13, the use of which will be hereinafter described in detail.

Mounted on frame 8, Figure 2, is a holder 14 which is also co-axial with mandrel 12 and through which said mandrel freely extends. Extending outwardly from holder 14 is a resilient multiple segment of substantially straight and uniform bore, hollow expansion member 15, as shown in Figure 2, the head 16 of which is held within the counterbore of holder 14 by means of an anchoring member 17. It is thus to be seen that when piston rod 7 moves to the left it will draw the enlarged outer end portion of mandrel 12 into the outer end of multiple segment expansion member 15 and expand same in an outward direction. Return movement of piston rod 7 then allows this expansion member to retract once more to the position shown in Figure 2.

The operation of the above described apparatus involves the actuation of a series of switches as will be presently described. The operating voltage for this apparatus, for instance 110 volts, is received through power line 18 which is connected to the electric circuit of the present apparatus in junction box 19 through which the various lines to the switches and solenoids are conventionally connected.

Fixedly mounted on frame 8 is a tubular member 20 through which slidably extends a push rod 21 on the outer end of which is mounted an actuator 22 which has a slotted end 23 adapted to loosely fit over multiple segment expansion member 15 even when the latter is in expanded position. The opposite end of push rod 21 is in contact with operating lever 24 of starting switch 25. When hose coupling 26 is pressed against actuator 22, this actuator moves rod 21 endwise against operating lever 24, and closes the circuit through starting switch 25 and that switch through lines 27 and 28 delivers electric power through line 29 and current break switch 30 through line 31 to solenoid 6, and its return line 32. This solenoid in turn actuates four-way valve 4 to deliver air from air inlet pipe 33, carrying air under operating pressure, through pipe 2 to double acting cylinder 1, and at the same time permits exhaust from the opposite end of that cylinder through pipe 3 and valve 4 out of exhaust pipe 34. This causes disc member 13 on piston rod 7 to move toward actuating lever 35 of return switch 36. As soon as piston rod 7 starts moving to the left this allows operating lever 37 of current break switch 30 to move to the left from the position in which disc member 13 has been holding it. That breaks the electric circuit to solenoid 6 and de-energizes same. At the same time, the movement of operating lever 37 to the left closes the circuit through line 38 to return switch 36.

When piston rod 7 has been fully retracted, disc 13 contacts operating lever 35 of return switch 36 and closes the circuit through line 39 to the second solenoid 5 which reverses four-way valve 4 to direct air under pressure through pipe 3 to double acting cylinder 1 and at the same time connects pipe 2 from the other end of the cylinder to exhaust pipe 34 all of which, in turn, causes piston rod 7 to be moved to the right. As soon as the piston rod starts to move to the right, the circuit closing pressure exerted by disc 13 on operating lever 35 is released, and the circuit through return switch 36 is broken and solenoid 5 de-energized. When the piston rod has returned to its original starting position, disc 13 actuates operating lever 37 and again closes the electric circuit to starting switch 25 which thus places the apparatus once more in condition for starting a new cycle. When this return stroke of piston rod 7 is started, the operator starts pulling on the hose coupling assembly and as soon as the multiple segment expansion member contracts sufficiently, the mounted coupling is removed which leaves the apparatus ready for the mounting of another coupling.

Since the multiple segments 40 of expansion member 15 carry rib like corrugations 41, the expanded ribs in the coupling sleeve 42 will have a notched appearance caused by the separation of the multiple segments in expanding. To eliminate this corrugated effect and make a still tighter joint, where maximum holding power is required, the coupling can be held tight against actuator 22 so that the machine will re-cycle and while that is taking place the operator can slightly rotate the coupling and thus eliminate the notches in the ribs which have been formed in the coupling sleeve.

A mechanical release member 43, Figure 1, may be connected to operating lever 37 of current break switch 30 so that when actuator 22 is depressed, the piston rod 7 will move to its fully retracted position and stop since the holding of operating lever 37 by pulling on mechanical release member 43, will break the electric circuit to return switch 36. This is advantageous in setting the expanding mandrel 12 so that it will be drawn a given distance into the multiple segment expansion member 15 which determines the amount of expansion to be applied to the coupling sleeve 42. In other words, it permits the working out of the desired expansion adjustments. The moment that the pull on mechanical release member 43 is released, operating member 37 will move back and close the electric circuit to return switch 36 whereupon the machine will revert to normal operation and return mandrel 12 to starting position ready for commencing the next complete cycle of operation.

The above description of the machine of the present invention has been set forth in terms of expanding the hose coupling sleeve by pulling expansion mandrel 12 into expansion member 15 and then pushing that mandrel back to starting position at the end of the cycle. This apparatus is also adapted for use with the mandrel motion being in the opposite direction throughout its cycle of operation. In this case, as is shown in Figures 3 and 4, the starting position for the cycle will be with the piston rod and mandrel in their left-most position. Under these conditions current break switch 30 and return switch 36 would be interchanged from their positions shown in Figure 1 and would also be turned 180° so as to operate in the opposite direction. Mandrel 12a would then be made with the taper in opposite direction, and the segments 40a of the expansion member, which may be rigidly anchored as shown in Figure 2, or of the conventional free floating type 15a shown in Figure 4, would be provided with an inward taper under the rib-like corrugation portion 41 corresponding with the desired taper on mandrel 12a. With the apparatus thus constructed, the pushing of actuator 22 with the hose coupling 26 would cause piston rod 7 and mandrel 12a to move to the right and outwardly expand multiple segments 40a of expansion member 15a whereupon return switch 36 would be actuated and cause the piston rod and mandrel to move back to the left to starting position ready for recycling. This procedure presents the advantages of having a shorter extending portion over which to thread the end of the hose carrying the hose coupling to be mounted thereon, and also the left-hand face of the piston head (not shown) has a larger operating pressure area, since it is not reduced by the area of the psiton rod, and hence the same air pressure will produce a more powerful operating force.

Other modes of applying the principle of our invention may be employed instead of those explained, change being made as regards the apparatus herein disclosed, provided the means stated by any of the following claims or the equivalent of such stated means be employed.

We therefore particularly point out and distinctly claim as our invention:

1. In an electrical apparatus for controlling the movement of a reciprocating member in manner moving it from one end of its travel to the other and then back to starting position, which comprises a reversible source of moving power, means for operably connecting said source of moving power to said reciprocating member, a pair of solenoids controlling the reversing of the movement of said source of moving power, a starting switch, said starting switch being of the normally open single electric circuit type, a return switch, said return switch being of the normally open single electric circuit type, a current break switch, said current break switch being of the double electric circuit type with either circuit open when the other is closed, one of said electric circuits of said current break switch being in the electric circuit controlling movement of said reciprocating member in one direction while the other electric circuit of said current break switch is in the electric circuit controlling the reverse movement of said reciprocating member, said current break switch normally remaining closed in the reverse movement electric circuit, means moving in unison with said reciprocating member for contacting and operating said return switch to close the circuit through same at the end of the first movement of said reciprocating member and also to contact and operate said current break switch at the end of the reverse movement of said reciprocating member to open the return movement electric circuit through same and also to close the first direction movement electric circuit through same, thus resetting the apparatus ready for repeating the forward and reverse movement cycle upon further actuation of said starting switch to close electric circuit through same, and an electric circuit operably connecting said switches so that said starting switch circuit is in series with the solenoid controlling the forward movement of said reciprocating member and also in series with the closed forward movement circuit portion of said current break switch at the start of the expansion cycle, and said return switch is in series with the other of said solenoids and also in series with the closed reverse movement circuit portion of said current break switch at the start of the reverse movement portion of the operating cycle, thus making possible the reversible movement of said reciprocating member in continuous sequence to complete the cycle of operation of the apparatus once the starting switch has been actuated.

2. In an apparatus for actuating and controlling a hose coupling mounting machine having a hollow expansion member which has one end holdable against endwise movement while the other end has a multiplicity of elongated and resilient expandable segments arranged in tubular pattern and over the end of which the end of the hose coupling placed on the end of a section of hose, for fixedly mounting thereon, is threaded and held in substantially fixed mounting position, an expansion mandrel, said mandrel fitting into the hollow portion of said expansion member and being adapted for reciprocating movement lengthwise thereof to expand and then allow same to contract, means for holding said hollow expansion member substantially fixed against endwise movement, and means for reversibly moving said mandrel first in a direction to expand said resilient segments and then in a direction allowing them to contract, the combination which consists of an apparatus, which when actuated, causes said expansion machine, through said means for reversibly moving said mandrel, to pass through a complete cycle of hose coupling mounting operation, said actuatable apparatus comprising a starting switch, said starting switch being of the normally open single electric circuit type, an actuator, means for mounting said actuator so that it closes said starting switch when said hose coupling carried on said section of hose is placed in mounting position on said hollow expansion member, a return switch, said return switch being of the normally open single electric circuit type, a current break switch, said current break switch being of the double electric circuit type with either circuit open when the other is closed, one of said electric circuits of said current break switch being in the electric circuit controlling the expansion portion of the cycle of said machine while the other electric circuit of said current break switch is in the electric circuit controlling the retraction portion of the cycle of said machine, means moving in unison with said mandrel for contacting and operating said return switch to close the circuit through same at the end of the expansion cycle and said current break switch to open said retraction electric circuit through same and also to close the expansion electric circuit through same at the end of the retraction portion of the cycle of said machine, thus resetting the machine for repeating the complete expansion and retraction cycle upon further actuation of said starting switch to close the electric circuit through same, and an electric circuit operably connecting said switches so that said starting switch circuit is in series with the closed expansion circuit portion of said current break switch at the start of the expansion cycle, and said return switch is in series with the closed retraction circuit portion of said current break switch at the start of the retraction cycle, thus making possible the reversible operation of said means for moving said mandrel in continuous sequence to complete the cycle of operation of the machine once the starting switch has been actuated.

3. In an actuating and controlling apparatus as set forth in claim 2, wherein said means for reversibly moving the mandrel is a double acting cylinder with the mandrel connected to the piston rod of said cylinder for endwise movement in unison therewith, and wherein there is a double solenoid operated valve for delivering operating fluid under suitable pressure to either end of said cylinder, depending upon which solenoid is operated, to correspondingly control the movement of said mandrel in desired direction, one of said solenoids being connected in the electric circuit which includes the starting switch and that portion of the current break switch which controls the expansion portion of the cycle of said machine so that actuation of said solenoid will move said mandrel through the expansion portion of said cycle, while the other solenoid is connected in the electric circuit which includes the return switch and that portion of the current break switch which controls the retraction portion of the cycle of said machine so that actuation of said other solenoid will move said mandrel through the retraction portion of said cycle.

References Cited in the file of this patent

UNITED STATES PATENTS

| | | |
|---|---|---|
| 540,741 | Jones | June 11, 1895 |
| 2,286,026 | Towler | June 9, 1942 |
| 2,324,030 | Schellin | July 13, 1943 |
| 2,357,873 | Bower | Sept. 12, 1944 |
| 2,372,813 | Darling | Apr. 3, 1945 |
| 2,377,829 | Vaill | June 5, 1945 |
| 2,394,341 | Strong | Feb. 5, 1946 |
| 2,438,999 | Hartley | Apr. 6, 1948 |
| 2,508,377 | Doerr | May 23, 1950 |
| 2,523,628 | Nelson | Sept. 26, 1950 |
| 2,529,777 | McInnis | Nov. 14, 1950 |